(12) United States Patent
Schlueter et al.

(10) Patent No.: US 10,657,632 B2
(45) Date of Patent: May 19, 2020

(54) APPARATUS HAVING A USER INTERFACE FOR ENHANCING MEDICAL IMAGES

(71) Applicant: KONINKLIJKE PHILIPS N.V., Eindhoven (NL)

(72) Inventors: Mathias Schlueter, Ahrensburg (DE); Andre Goossen, Radbruch (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 66 days.

(21) Appl. No.: 15/778,030

(22) PCT Filed: Nov. 17, 2016

(86) PCT No.: PCT/EP2016/077949
§ 371 (c)(1),
(2) Date: May 22, 2018

(87) PCT Pub. No.: WO2017/089215
PCT Pub. Date: Jun. 1, 2017

(65) Prior Publication Data
US 2018/0342049 A1    Nov. 29, 2018

(30) Foreign Application Priority Data

Nov. 26, 2015   (EP) ..................................... 15196414

(51) Int. Cl.
*G06T 5/20* (2006.01)
*G06T 5/10* (2006.01)
(Continued)

(52) U.S. Cl.
CPC ............ *G06T 5/20* (2013.01); *G06F 3/04847* (2013.01); *G06F 17/11* (2013.01); *G06T 5/10* (2013.01); *G06T 2207/10116* (2013.01)

(58) Field of Classification Search
None
See application file for complete search history.

(56) References Cited

U.S. PATENT DOCUMENTS

2003/0228065 A1* 12/2003 Kaltschmidt ............. G06T 5/10
                                                              382/260
2009/0097732 A1*  4/2009 Bohm .................... A61B 6/583
                                                              382/132
(Continued)

FOREIGN PATENT DOCUMENTS

DE      19849090 A1     4/2000
DE      10214114 A1    10/2003
(Continued)

OTHER PUBLICATIONS

Nercessian, S. et al., "A Parametric Method for Edge Detection Based on Recursive Mean-Separate Image Decomposition", Proceedings of the Seventh International Conference on Machine Learning and Cybernetics, Kunming, Jul. 12-15, 2008, pp. 3689-3694.

*Primary Examiner* — Fayyaz Alam
(74) *Attorney, Agent, or Firm* — Larry Liberchuk

(57) ABSTRACT

The invention relates to an apparatus (100) for processing a medical image (IM) of a structure of interest (SOI). The apparatus comprises a first unit (101) configured for decomposing the medical image (IM) into at least one band pass image ($B_{dl}$) and a low pass image (L); a user interface (102) arranged for enabling a user to specify an enhancement curve (EC) for the radiographic image (IM) based on at least one of (i) a metric structure length (l), (ii) a structure selectivity (s) and (iii) a structure enhancement strength (a); a second unit (103) configured for applying the enhancement curve (EC) to the at least one band pass image ($B_{dl}$) for generating at least one enhanced band pass image $EB_{dl}$; and a third unit (105) configured for composing an enhanced medical image (EIM) based on the at least one enhanced (Continued)

band pass image ($EB_{dl}$) and the low pass image (L). The invention also relates to a corresponding method of processing a medical image (IM).

11 Claims, 7 Drawing Sheets

(51) Int. Cl.
*G06F 3/0484* (2013.01)
*G06F 17/11* (2006.01)

(56) References Cited

U.S. PATENT DOCUMENTS

2009/0169086 A1* 7/2009 Thoms .................. G06T 5/10
 382/132
2012/0269414 A1* 10/2012 Zha .................. G06T 5/002
 382/131

FOREIGN PATENT DOCUMENTS

DE 10325632 A1 12/2004
WO WO2006010372 A1 2/2006

* cited by examiner

APPARATUS HAVING A USER INTERFACE FOR ENHANCING MEDICAL IMAGES

FIELD OF THE INVENTION

The invention relates to the field of medical imaging, in particular to an apparatus for processing a medical image, a system comprising such apparatus and a method for processing a medical image.

BACKGROUND OF THE INVENTION

Radiographic imaging devices are widely used to obtain information about internal structures of a structure of interest e.g. a human body. Excellent visibility of relevant anatomical and pathological structures is required in high quality radiographic images. Image enhancement, and more specifically multi scale image decomposition, is commonly used for that purpose. Herein, the radiographic image is decomposed into a plurality of (spatial) band pass images (also referred to as frequency bands). That is, since the size of certain structures (e.g. trabeculae in bone images, nodules in chest images and microcalcifications in digital mammograms) has a distribution around some characteristic structure length, visibility of those structures can be enhanced if one or more such frequency bands, adapted to the structure size distribution at hand, are either amplified or suppressed. More in particular an image enhancement curve is applied to the decomposed frequency band pass images to amplify or suppress certain frequency bands.

DE19849090 (A1) discloses enhancing mutually separate i.e. single frequency bands after multi scale image decomposition.

A problem of the known methods is in their inability to enhance a plurality of frequency bands resulting from a multi-scale image decomposition in a manner that is efficient for clinical diagnosis.

SUMMARY OF THE INVENTION

There may be a need to provide for an apparatus for processing a medical image which enables efficiently enhancing a plurality of frequency bands resulting from a multi-scale image decomposition, thereby reducing errors and facilitating use for the medical staff.

The object of the present invention is solved by the subject-matter of the independent claims, wherein the dependent claims define advantageous embodiments. It should be noted that the following described aspects of the apparatus for processing a radiographic image apply also for the system according to the invention and the method for processing a radiographic image according to the invention.

According to a first aspect of the present invention, an apparatus for processing a medical image is provided. The apparatus comprises a first unit configured for decomposing the medical image into at least one band pass image and a low-pass image. The apparatus furthermore comprises a user interface arranged for enabling a user to specify an enhancement curve for the medical image based on at least one of (i) a metric structure length, (ii) a structure selectivity and (iii) a structure enhancement strength. The apparatus furthermore comprises a second unit configured for applying the enhancement curve to the at least one band pass image to generate at least one enhanced band pass image. The apparatus furthermore comprises a third unit configured for composing an enhanced medical image based on the at least one enhanced band pass image and the low pass image. The apparatus according to the present invention employs at least one of (i) a metric structure length, (ii) a structure selectivity and (iii) a structure enhancement strength, which are all parameters having physical and/or clinical meaning, to specify the enhancement curve. Consequently, the specification of the enhancement curve is intuitive for the user i.e. clinician hence efficient. Accordingly, the apparatus according to the present invention allows for reducing errors during operation. In a sense the apparatus according to the present invention provides for a user interface, using parameters with physical and/or clinical meaning, for image enhancement based on multi scale image decomposition.

The apparatus may be configured to define the enhancement curve based on a decomposition level dependent enhancement parameter. This may enable mutually separately enhancing each decomposition level.

In this text, a medical image may be a radiographic image. The radiographic image means an image acquired on a diagnostic X-ray radiography system, a diagnostic X-ray fluoroscopy system, an interventional X-ray system or a mammography system. The medical image may also be an image acquired with other imaging modalities such as ultrasound, computed tomography or magnetic resonance.

In an example of the apparatus according to the present invention, the apparatus is configured to enable the user to define the metric structure length based on a size of the structure of interest. This example enables the user to choose the metric structure length e.g. by measuring directly (either manually, but preferably via some image processing algorithm) the size of the structure of interest based on the medical image at hand. This example allows for a very user intuitive clinical way of working which is tailored to the structure of interest at hand.

In another example of the apparatus according to the present invention, the apparatus is configured to enable the user to choose the structure selectivity in the range of minimum selectivity to maximum selectivity. Herein, a larger structure selectivity implies a narrower bandwidth with respect to the metric structure length. Herein minimum selectivity, which may be identified with "0" or "0%", means that enhancement is uniform for all band pass images. Maximum selectivity, which may be labelled as "1" or "100%", means that only one or two band pass images with mid frequencies nearby the metric structure length will be enhanced. In this sense the structure selectivity has the intuitive meaning of the inverse band width of a band equalizer known per se. The clinical staff can specify this structure selectivity directly or by indicating a minimal and maximal length of the structure of interest in the image. This example allows for a very user intuitive clinical way of working tailored to the structure of interest at hand.

In another example of the apparatus according to the present invention, the apparatus is configured for specifying the enhancement curve in dependence of the decomposition level. In other words this example is configured for generated in a set i.e. plurality of enhancement curves, wherein each of said enhancement curves relates to a specific decomposition level. This example enables mutually separately enhancing each decomposition level.

In another example of the apparatus according to the present invention, the apparatus is configured to define the enhancement curve based on a decomposition level dependent enhancement parameter. This example enables mutually separately enhancing each decomposition level.

In another example of the apparatus according to the present invention, the apparatus is configured to define the decomposition level dependent enhancement parameter as a product of (i) at least one decomposition level dependent weight and (ii) the structure enhancement strength. Herein, the structure enhancement strength is decomposition level independent. This example enables the enhancement parameter to be a modulation of the structure enhancement strength based on the decomposition level dependent weights, which allows for mutually separately customizing the enhancement for each decomposition level.

In another example of the apparatus according to the present invention, the apparatus is configured to define the at least one decomposition level dependent weight based on (i) the metric structure length and (ii) the structure selectivity. This example enables the decomposition level dependent weights to be a function of the metric structure length and the structure selectivity, which allows for further intuitive enhancement for each decomposition level.

In another example of the apparatus according to the present invention, the user interface comprises a band equalizer for enabling a user to specify at least one of (i) the metric structure length, (ii) the structure selectivity and (iii) the structure enhancement strength. This example allows the clinician to specify the parameters, all having physical and/or clinical meaning, in a very convenient manner.

According to a second aspect of the present invention, an X-ray system is provided. The X-ray system according to the present invention comprises the apparatus according to the present invention, and furthermore comprises an X-ray source for generating an X-ray radiation beam towards the structure of interest and an X-ray detector configured to detect the X-ray radiation beam after passage of the structure of interest for subsequently generating a medical image.

According to a third aspect of the present invention, a method for processing a medical image system is provided. The method according to the invention comprises a step of decomposing the medical image into at least one band pass image and a low pass image; a step of enabling a user to specify an enhancement curve for the medical image based on at least one of (i) a metric structure length, (ii) a structure selectivity and (iii) a structure enhancement strength; a step applying the enhancement curve to the at least one band pass image to generate at least one enhanced band pass image; a step of composing an enhanced medical image based on the at least one enhanced band pass image and the low pass image.

In an example of the method according to the present invention, the step of enabling further enables the user to define the metric structure length based on a size of the structure of interest.

In another example of the method according to the present invention, the step of enabling further enables the user to choose the structure selectivity in the range of minimum selectivity to maximum selectivity.

According to a fourth aspect of the present invention, a computer program element is provided for controlling the apparatus according to the invention for processing a medical image for a structure of interest when being executed by a processing unit adapted to perform the method according to the invention.

According to a fifth aspect of the present invention, a computer readable medium is provided having stored thereon the program element according to the present invention.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
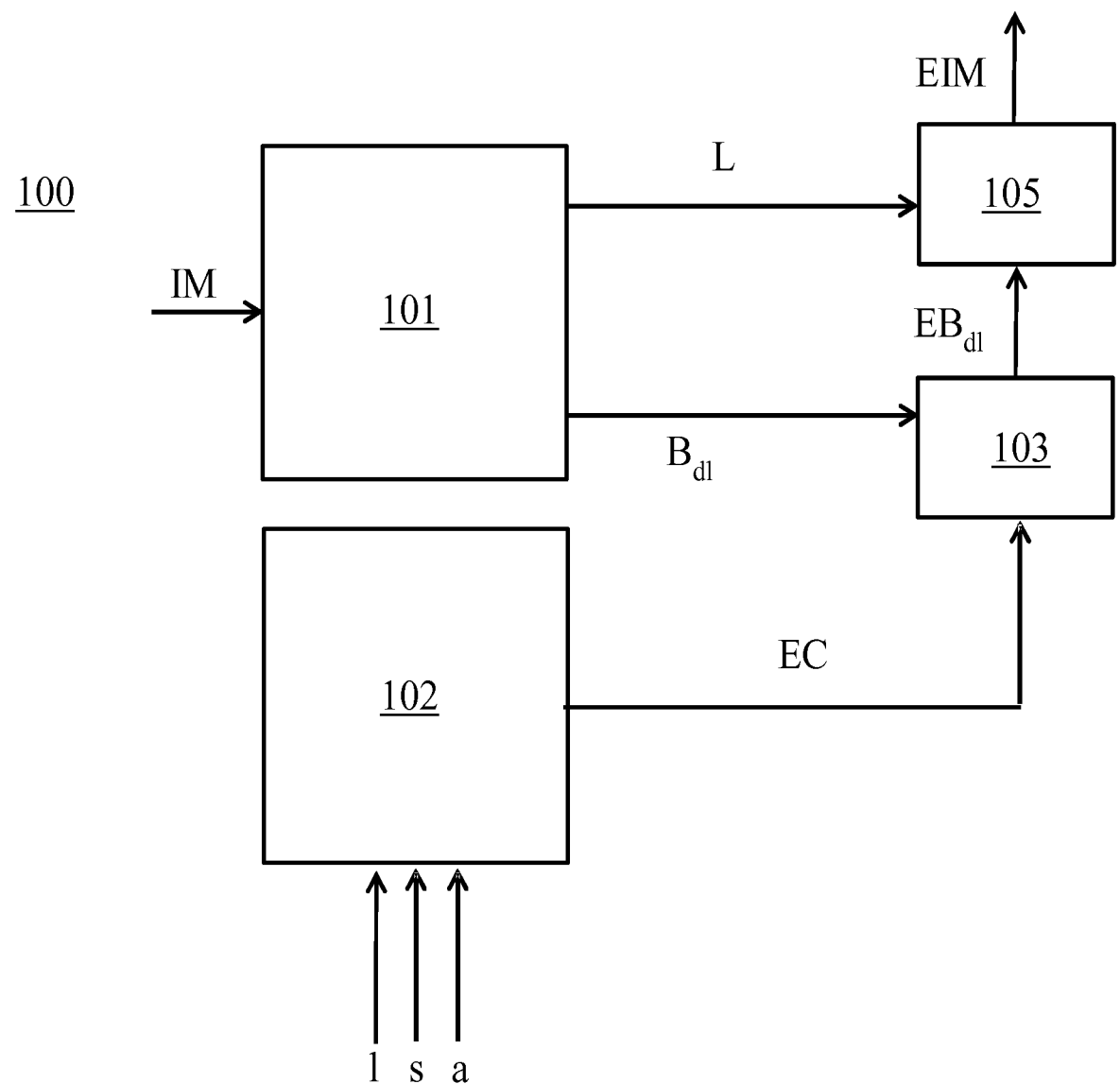
FIG. 1 schematically depicts the apparatus according to the present invention.

FIG. 1 schematically depicts an apparatus 100 for processing a medical image (IM) of a structure of interest (SOI). The apparatus 100 comprises a first unit 101 configured for decomposing the medical image IM into at least one band pass image $B_{dl}$ and a low pass image L. The apparatus 100 furthermore comprises a user interface 102 arranged for enabling a user to specify an enhancement curve EC for the radiographic image IM based on at least one of (i) a metric structure length l, (ii) a structure selectivity s and (iii) a structure enhancement strength a. The apparatus 100 furthermore comprises a second unit 103 configured for applying the enhancement curve EC to the at least one band pass image $B_{dl}$ to generate at least one enhanced band pass image $EB_{dl}$. The apparatus 100 furthermore comprises a third unit 105 configured for composing an enhanced medical image EIM based on the at least one enhanced band pass image $EB_{dl}$ and the low pass image L. The metric structure length l corresponds to a characteristic structure length of a certain structure of interest SOI. The structure selectivity s defines the selectivity around the characteristic structure length l. By increasing the selectivity s, the bandwidth around the characteristic structure length l is becoming narrower. Hence the structure selectivity s corresponds to the distribution of the length of the structure of interest SOI around the characteristic structure length. More specifically, if the length of the structure of interest SOI is distributed very narrow around the characteristic structure length l, the selectivity s has to be chosen close to 1 or 100%. Likewise, if the length of the structure of interest SOI is distributed very widely around the characteristic structure length l, the selectivity s has to be chosen close to 0 or 0%. The structure enhancement strength defines the desired enhancement strength to be applied to the decomposed band pass image $B_{dl}$.

The medical image IM contains anatomical information including the structure of interest SOI which is intended to be examined by the radiologist. The structure of interest SOI may be trabeculae in bone images, nodules in chest images or microcalcifications in mammograms.

Figure 2:
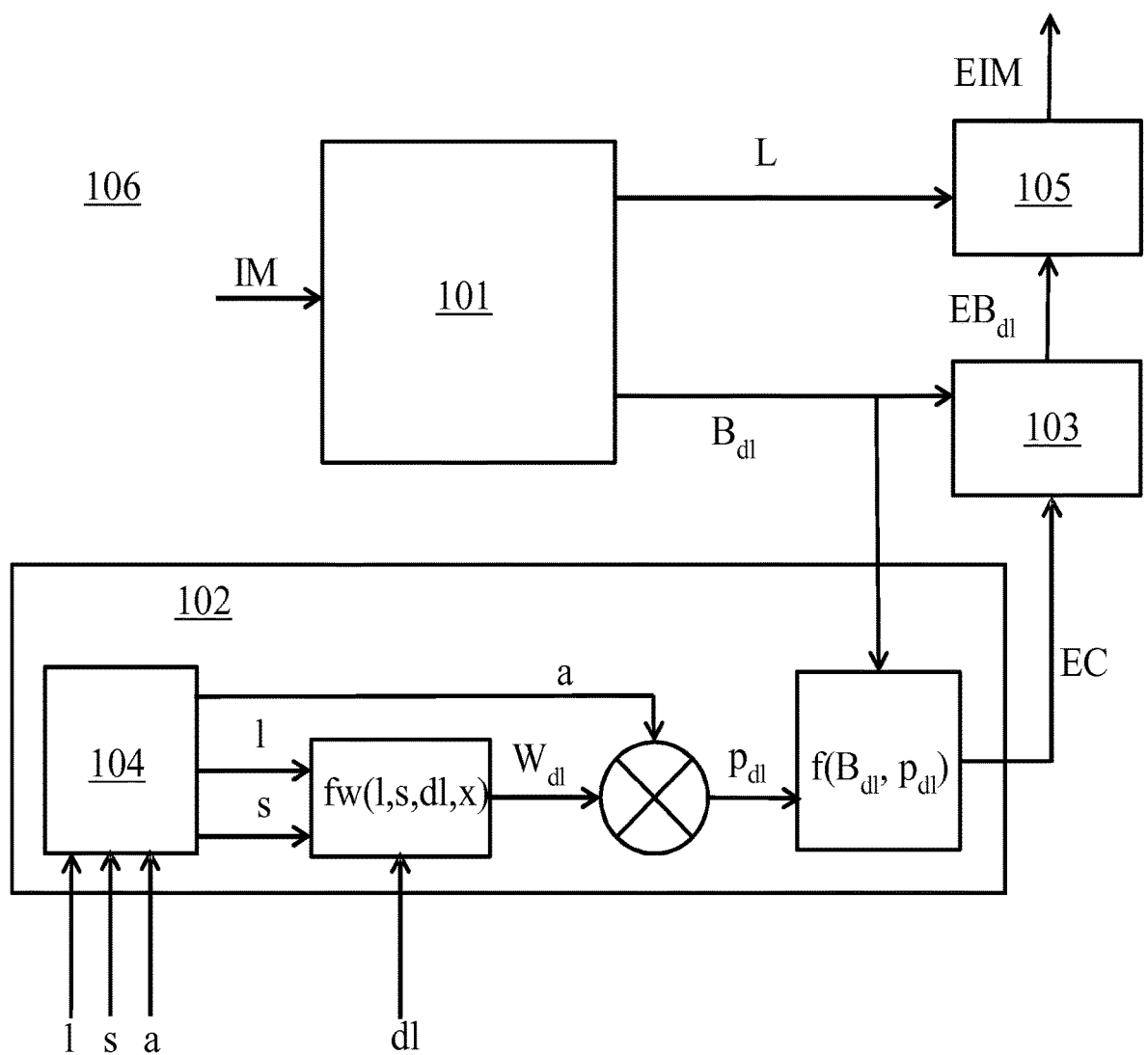
FIG. 2 schematically depicts an embodiment of the apparatus according to the present invention.

In an example of the apparatus 106 as depicted in FIG. 2, the first unit 101 is configured for performing a multi scale decomposition of the medical image 100 i.e. configured for decomposing the medical image into a plurality of band pass images $B_{dl}$ and one low pass image L. Multi scale decomposition means that the number of decomposition levels is larger than 1. For example, a multi scale band pass image comprises a plurality of band pass images and one low pass image. Within the scope of multi scale decomposition, the medical image IM may be expressed as a sum of the multi scale band pass images and the last low pass image. For example:

$$IM = \Sum_{dl=0}^{n-1} U^{dl} B_{dl} + U^n L_n. \quad (1)$$

Herein the number of multi scale levels is denoted by n, decomposition level dl is in the range of $\{0, \ldots, n-1\}$, and U is a parameter of the decomposition representing e.g. smoothing and/or down-sampling method (if any). Herein, the dependency on decomposition level is denoted by the subscript "dl". Herein, image enhancement is obtained for some band pass image if applying the enhancement curve EC increases the amplitude of the band pass image $B_{dl}$.

Figure 3:
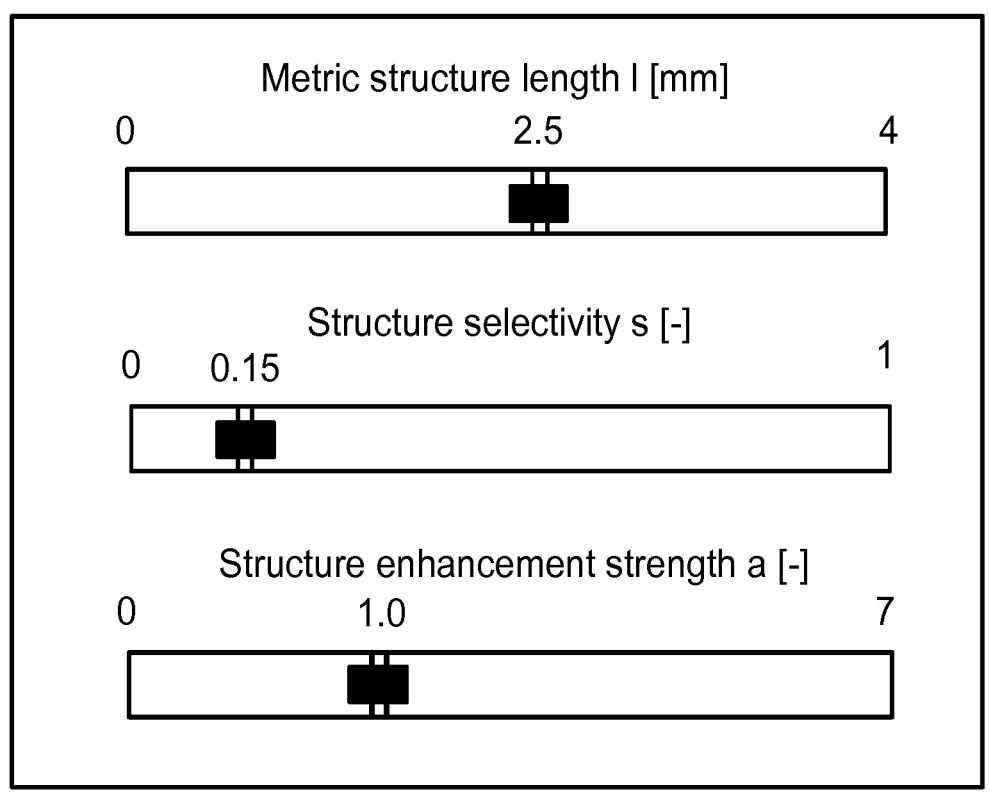
FIG. 3 schematically illustrates an example of the band equalizer according to an embodiment of the present invention.

Referring to FIG. 2, in a specific example of the apparatus 106 the user interface 102 comprises a band equalizer 104 for enabling the user to specify at least one of (i) the metric structure length l, (ii) the structure selectivity s and (iii) the structure enhancement strength a. Such band equalizer 104 may be realized by a touch screen. FIGS. 3A and 3B display such band equalizer 104 in more detail. In this specific example, the band equalizer 104 enables the user to specify all of (i) the metric structure length (l), (ii) the structure selectivity (s) and (iii) the structure enhancement strength (a). In this specific example, for that purpose, the band equalizer 104 is realized by way of a three channel equalizer. The user may specify the metric structure length (l), the structure selectivity (s) and the structure enhancement strength via the top channel, the middle channel and the bottom channel, respectively, of the band equalizer 104.

In an example of the apparatus 106, the user may specify the metric structure length l within a predefined range. In the specific example displayed in FIG. 3, the user may specify a metric structure length l within a range from 0 mm to 4 mm. In this specific example, the metric structure length is set at 2.5 mm. Depending on the clinical application another range may be more feasible.

Another example of the apparatus 106 is configured to enable the user to choose the structure selectivity s in the range of minimum selectivity to maximum selectivity. In the specific example displayed in FIGS. 3A and 3B, the user may specify the structure selectivity s within a range from 0 [−] to 1 [−] wherein "0 [−]" indicates minimum structure selectivity and "1 [−]" indicates maximum structure selectivity. In the specific example displayed in FIGS. 3A and 3B, the structure selectivity s is set to 0.15 [−].

Another example of the apparatus 106 is configured for enabling the user to specify a minimal length and a maximal length in relation to of the structure of interest SOI, based on which the apparatus 102 can derive the corresponding structure selectivity s.

The user may define the structure enhancement strength a as an amplification value indicative of the desired structure enhancement strength.

In another example of the apparatus 106, the user may specify the structure enhancement strength a within a range predefined. In the specific example depicted in FIG. 3, said range is from 0 [−] to 7 [−]. In the specific example depicted in FIGS. 3A and 3B, the structure enhancement strength a is set to 2.0 [−].

Referring to FIG. 2, another example of the apparatus 106 is configured to define the enhancement curve EC based on a decomposition level dl dependent enhancement parameter $p_{dl}$. Herein, the dependency on decomposition level is denoted by the subscript "dl". The decomposition level dl ranges from 0 to n−1, wherein n denotes the number of frequency bands.

In another example, the apparatus 106 is configured for specifying the enhancement curve EC in dependence of the decomposition level dl i.e. for specifying a separate enhancement curve EC for each and every decomposition level dl. Subsequently, the second unit 103 is configured for enhancing the medical image IM by applying such plurality of enhancement curves EC to the respective plurality of decomposed band pass images $B_{dl}$. More specifically, in this example of the apparatus 106, the enhancement curve EC may be specified as follows:

$$EC = f(B_{dl}, p_{dl}) \quad (2)$$

Referring to FIG. 2, in another example, the apparatus 106 is configured to define the enhancement parameter $p_{dl}$ as a product of (i) the structure enhancement strength a and (ii) the at least one decomposition level dl dependent weights $W_{dl}$:

$$p_{dl} = W_{dl} a \quad (3)$$

By doing so the enhancement parameter $p_{dl}$ is a modulation of the structure enhancement strength a with the decomposition level dependent weight $W_{dl}$. In case of a multi scale band pass image, $W_{dl}$ is an array of decomposition level dependent weights wherein each of said weights is related to a specific decomposition level. In order to preserve the total enhancement for varying selectivity s, the average of the decomposition level dl dependent weights $W_{dl}$ over the decomposition levels must equal one i.e.

$$\frac{1}{n} \sum_{dl=0}^{n-1} w_{dl} = 1.$$

An example of an enhancement curve EC is given by:

$$EC(B_{dl}, p_{dl}) = B_{dl}(1 + p_{dl} \exp(-|B_{dl}|/d)) \quad (4)$$

Herein, d denotes the amplification decay. In this example, the enhancement curve EC amplifies small frequency band images (i.e. small $B_{dl}$) by 1+$p_{dl}$, while large frequency band images images (i.e. large $B_{dl}$) are preserved i.e. amplified with 1. The structure enhancement parameter $p_{dl}$ may be in the range of $0 \leq p_{dl} < e^2 \approx 7.389$ to ensure monotony for the enhancement curve EC. An alternative straightforward enhancement curve EC results from the following linear approach:

$$EC(B_{dl}, p_{dl}) = B_{dl}(1 + p_{dl}) \quad (5)$$

Figure 4:
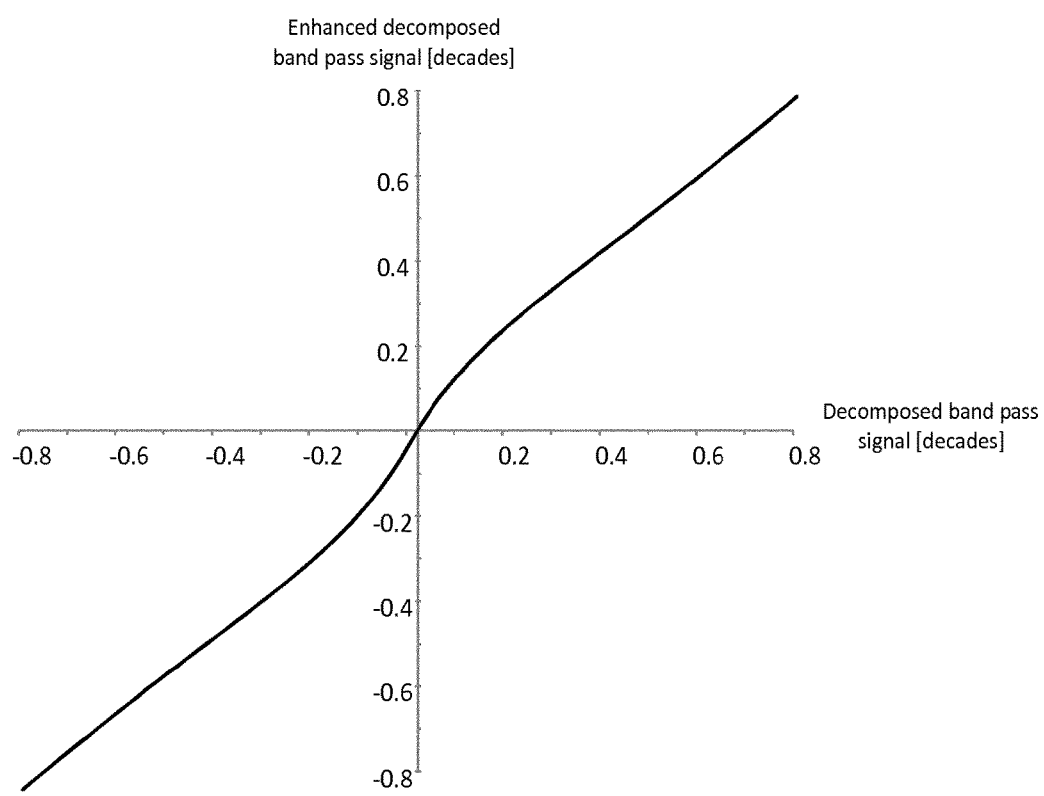
FIG. 4 illustrates an example of a specific enhancement curve according to an embodiment of the present invention.

FIG. 4 illustrates a specific example of an enhancement curve EC. This specific example provides for enhancement of small band pass signals (i.e. the slope of EC is larger than 1 if the band pass signal is less than 0.1 [decades]), and for preservation of large signals (i.e. the slope of EC equals 1 for band pass signals larger than 0.3 [decades]). Herein, the structure enhancement parameter $p_{dl}$ is set to 2 [−] and the amplification decay d is set to 0.1 [−].

Referring to FIG. 2 again, in another example, the apparatus 106 is configured to define decomposition level dependent weights $W_{dl}$ based on (i) the metric structure length l and (ii) the structure selectivity s. For example:

$$W_{dl} = f_W(dl, l, s, x) = \frac{1 + \cos[\pi s(dl - x)]}{2N} \text{ for } |s(dl - x)| < 1, \quad (6)$$

and $W_{dl} = 0$ otherwise

Herein the normalization constant N is given by $$N = \frac{1}{2n} \sum_{i=0}^{n-1} \{1 + \cos[\pi s(i - x)]\} \quad (7)$$

which ensures that the average of the weights over the decomposition levels is one i.e.

$$\frac{1}{n} \sum_{i=0}^{n-1} W_{dl,i} = 1.$$

In equation (6), x denotes continuous decomposition level number which is defined according to $x = \xi^{-1}(1/ps)$ wherein ps and l denote the metric pixel size and structure length, respectively. The level mapping function $\xi$ is defined by extending the discrete mapping from the discrete decomposition level dl to the mid structure length of the corresponding band pass to a continuous mapping, where the discrete decomposition level dl becomes a continuous decomposition level number x.

Another example of the apparatus 106 is configured to enable the user to define the metric structure length based on a size of the structure of interest SOI. More specifically, in this specific example, the user is able to specify (with the help of the user interface 102) a maximum size $l_{max}$ for the structure of interest SOI as well as a minimum size $l_{min}$ for said structure of interest SOI. Herein the user may choose $l_{max}$ and $l_{min}$ by inspecting e.g. measuring directly (either manually, but preferably via some image processing algorithm) the size of the structure of interest SOI based on the medical image IM at hand. In this example, the structure selectivity s may be calculated based on in the following:

$$s(\xi, ps, l_{max}, l_{min}) = \frac{1}{\xi^{-1}(l_{max}/ps) - \xi^{-1}(l_{min}/ps)} \quad (8)$$

Figure 5A:
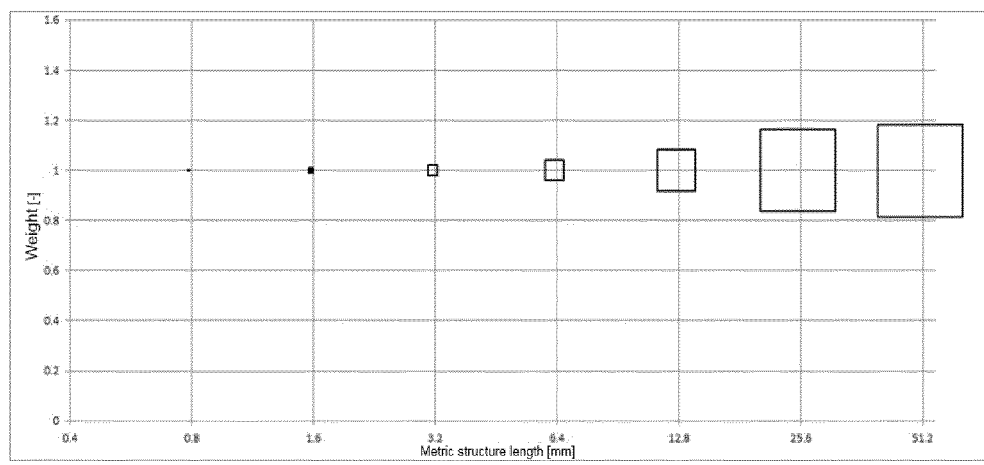
FIGS. 5A, 5B, 5C, 5D, 5E and 5F illustrate examples of weights according to embodiments of the present invention.
Figure 5B:
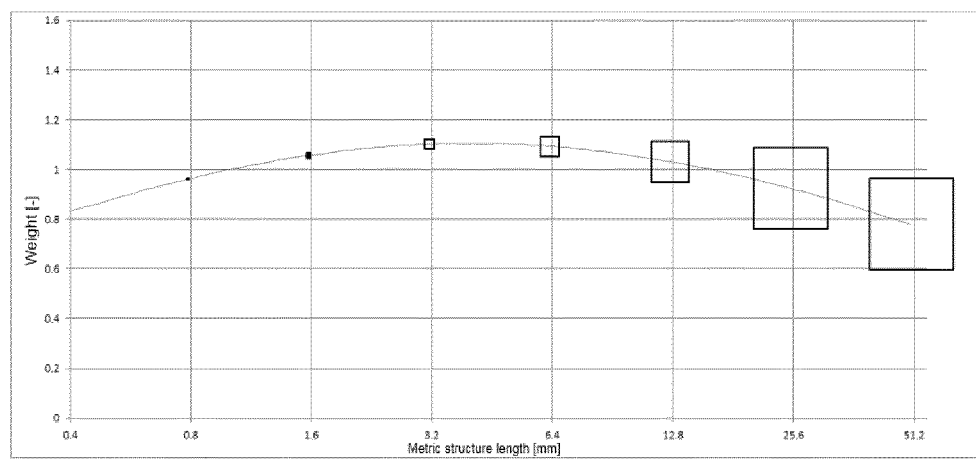
Figure 5C:
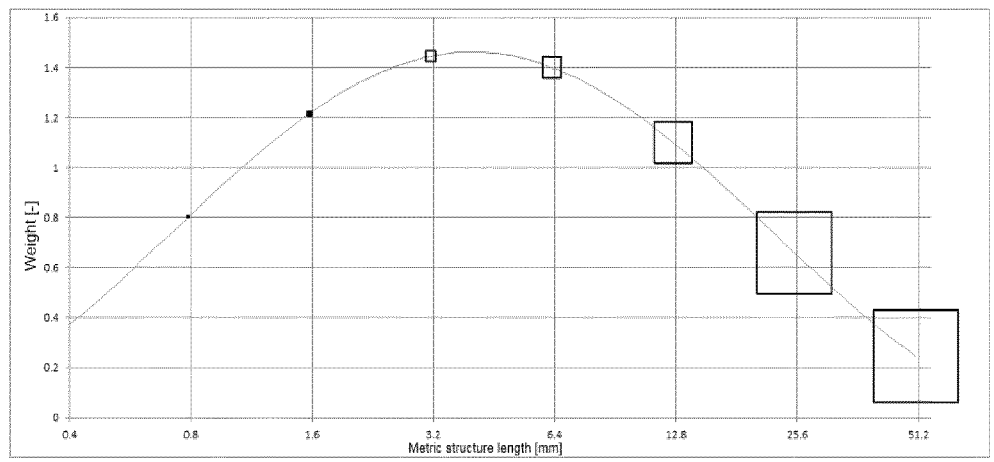
Figure 5D:
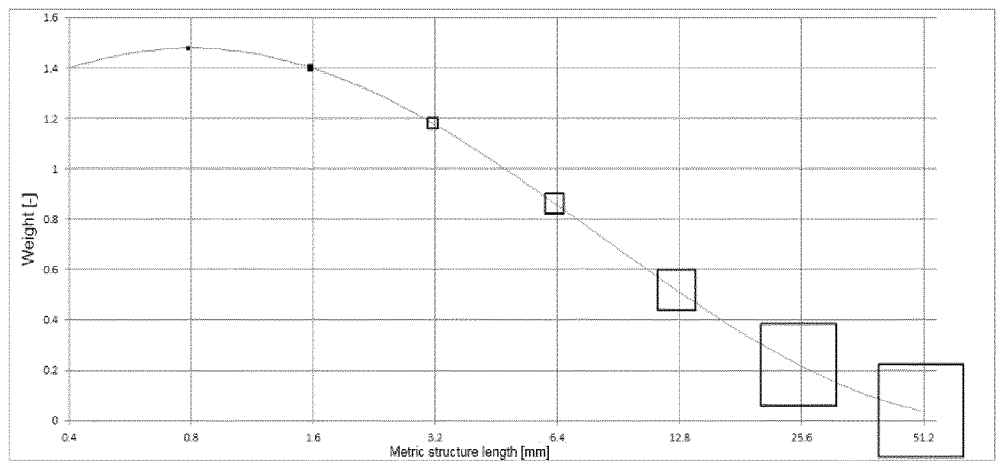
Figure 5E:
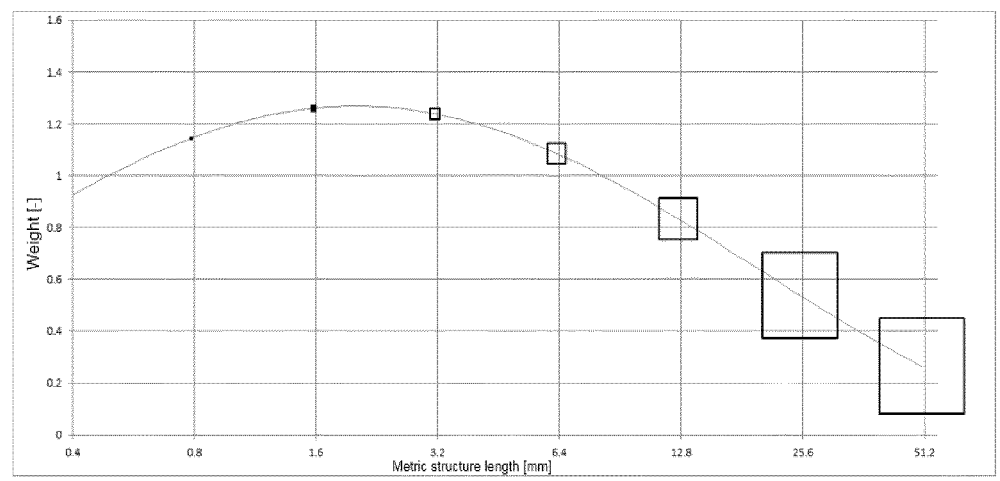
Figure 5F:
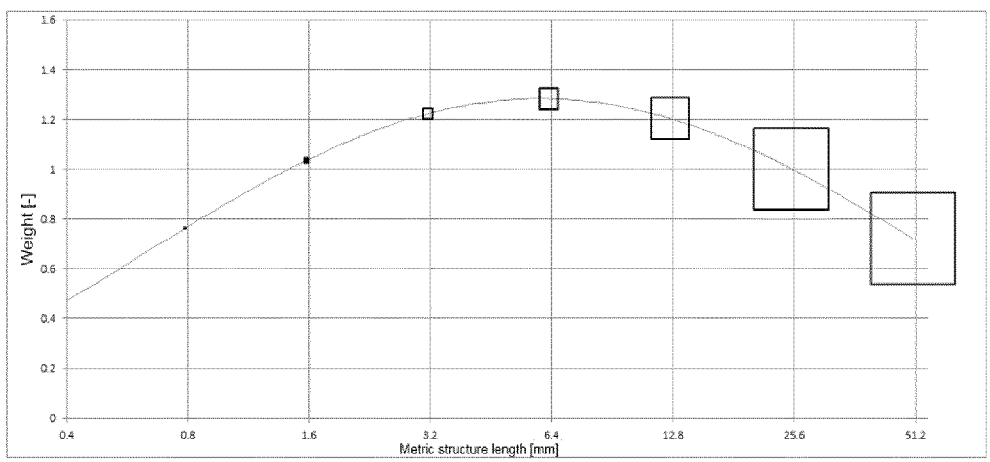

FIGS. 5A, 5B, 5C, 5D, 5E and 5F illustrate examples of the weights $W_{dl}$ according to embodiments of the present invention. In each of FIGS. 4A, 4B, 4C, 4D, 4E and 4F, the horizontal axis has a logarithmic scale. Herein, the size of the structures to be enhanced are indicated by the size of the respective squares. Herein, the horizontal coordinate of a square indicates the mid-structure length of the decomposition levels dl, and the vertical coordinate of a square indicates the value of the weights W. The size of a square is adapted to the zoom factor of the medical image IM and gives an indication which structure of interest SOI in the medical image IM to be selectively enhanced. The respective weights W are dependent on structure selectivity s and metric structure length l. For example, the metric structure length l is set to 4 mm and the structure selectivity s is set to 0 [–], 0.1 [–] and 0.2 [–] in FIGS. 5A, 5B and 5C, respectively. In FIGS. 5D, 5E and 5F, the structure selectivity s is set to 0.15 [–] and the metric structure length l is set to 0.8 mm, 2 mm and 6 mm, respectively.

Figure 6:
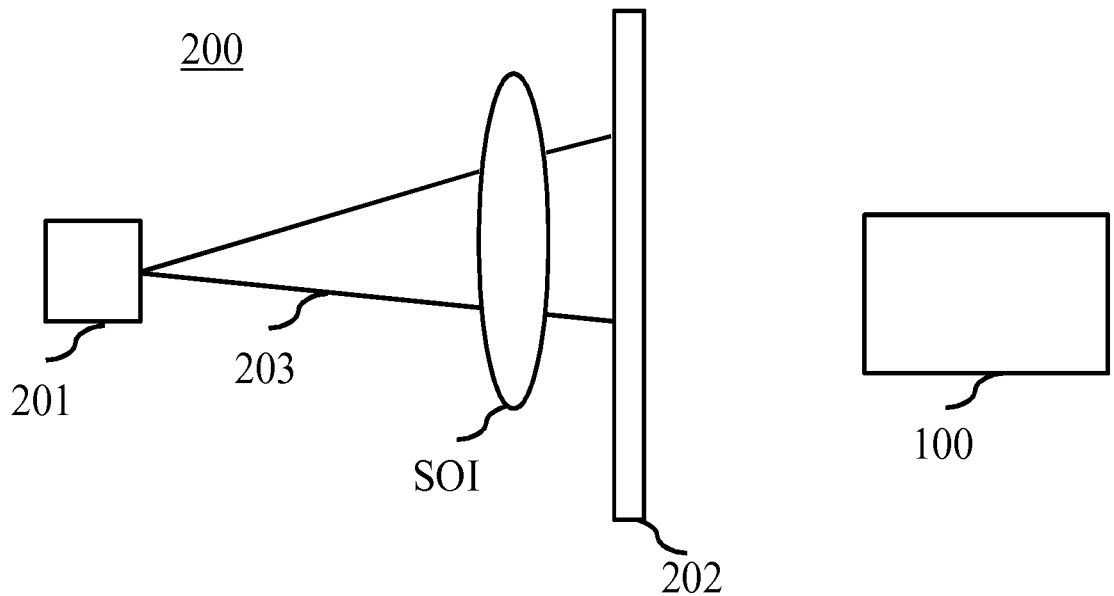
FIG. 6 schematically depicts an embodiment of the X-ray system according to an embodiment of the present invention.

FIG. 6 schematically depicts an X-ray system 200 according to the present invention. The X-ray system 200 comprises apparatus 100. The X-ray system 200 may be diagnostic X-ray radiography system, a diagnostic X-ray fluoroscopy system, an interventional X-ray system or a mammography system. The X-ray system 200 furthermore comprises an X-ray source 201 for generating an X-ray radiation beam 203 towards the structure of interest SOI. For example, the structure of interest SOI may be (a part of) a patient's body. The X-ray system 200 in addition comprises an X-ray detector 202. X-ray detector 202 is configured to detect the X-ray radiation beam 203 after passage through the structure of interest SOI, and is arranged for subsequently generating a medical image IM. The medical image IM contains anatomy information of the structure of the interest SOI. During operation, the medical image IM is subsequently sent to the apparatus 100 for enhancement along the lines described below in relation to method 300.

Figure 7:
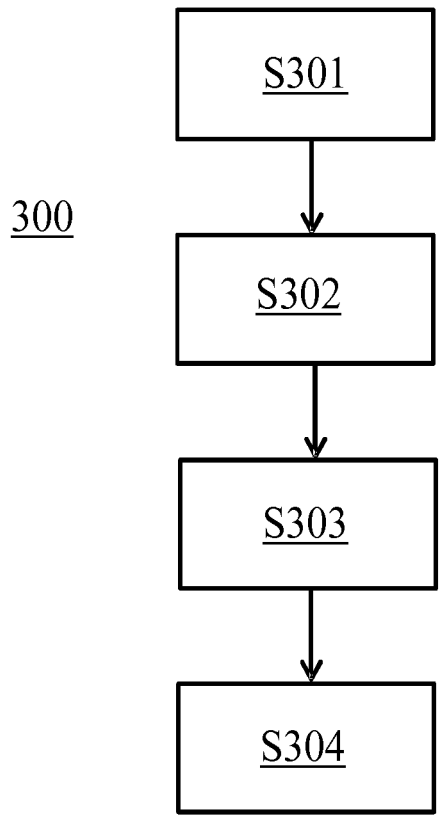
FIG. 7 schematically depicts a flowchart representing an embodiment of the method according to the present invention.

FIG. 7 depicts a flowchart schematically representing a method 300 for processing a medical image IM of a structure of interest SOI according to the present invention. The method 300 comprises a step of decomposing S301 the medical image IM into at least one band pass image $B_{dl}$ and a low pass image L. The method 300 also comprises a step of enabling S302 a user to specify an enhancement curve EC for the medical image IM based on at least one of (i) a metric structure length l, (ii) a structure selectivity s and (iii) a structure enhancement strength a. The method 300 further comprises a step of applying S303 the enhancement curve EC to the at least one band pass image $B_{dl}$ to generate at least one enhanced band pass image $EB_{dl}$. The method 300 furthermore comprises a step of composing S304 an enhanced medical image EM) based on the at least one enhanced band pass image $EB_{dl}$ and the low pass image L.

In an example, the step of enabling S302 further enables the user to define the metric structure length l based on a size of the structure of interest SOI.

In another example, the step of enabling S302 further enables the user to choose the structure selectivity s in the range of minimum selectivity to maximum selectivity. The structure selectivity s corresponds to the distribution of structure lengths around the characteristic length of the structure of interest SOI.

In another example, the step of enhancing S303 further enables the user to define the structure enhancement strength a as an amplification value indicative of the desired structure enhancement strength. The enhancement curve EC may be further based on the metric structure length l, the structure selectivity s and the structure enhancement strength a.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for processing a medical image of a structure of interest, comprising:
   a first processor configured for decomposing the medical image into a plurality of band pass images and a low-pass image;
   a user interface configured for specifying a plurality of enhancement curves for the medical image based on at least one of: a metric structure length, a structure selectivity, and a structure enhancement strength;
   a second processor configured for applying the plurality of enhancement curves to the plurality of band pass images to generate a plurality of enhanced band pass images; and
   a third processor configured for composing an enhanced medical image based on the plurality of enhanced band pass images and the low pass image;
   wherein the plurality of enhancement curves is based on a decomposition level dependent enhancement parameter, and wherein the decomposition level ranges from 0 to n−1, where n denotes the number of band pass images of the plurality of band pass images, and where a separate enhancement curve of the plurality of enhancement curves is specified for each decomposition level.

2. The apparatus according to claim 1, wherein the metric structure length is based on a size of the structure of interest.

3. The apparatus according to claim 1, wherein the structure selectivity is in a range of minimum selectivity to maximum selectivity.

4. The apparatus according to claim 1, wherein the decomposition level dependent enhancement parameter is defined as a product of at least one decomposition level dependent weight and the structure enhancement strength.

5. The apparatus according to claim 4, wherein at least one decomposition level dependent weight is based on the metric structure length and the structure selectivity.

6. The apparatus according to claim 1, wherein the user interface furthermore comprises a band equalizer for specifying at least one of:
the metric structure length, the structure selectivity, and the structure enhancement strength.

7. An X-ray system, comprising:
   a device for processing a medical image of a structure of interest, comprising:
      a first processor configured for decomposing the medical image into a plurality of band pass images and a low-pass image;
      a user interface configured for specifying a plurality of enhancement curves for the medical image based on at least one of: a metric structure length, a structure selectivity, and a structure enhancement strength;
      a second processor configured for applying the plurality of enhancement curves to the plurality of band pass images to generate a plurality of enhanced band pass images; and
      a third processor configured for composing an enhanced medical image based on the plurality of enhanced band pass images and the low pass image, wherein the plurality of enhancement curves is based on a decomposition level dependent enhancement parameter, and wherein the decomposition level ranges from 0 to n−1, where n denotes the number of band pass images of the plurality of band pass images, and where a separate enhancement curve of the plurality of enhancement curves is specified for each decomposition level;
   an X-ray source for generating an X-ray radiation beam towards the structure of interest; and
   an X-ray detector configured to detect the X-ray radiation beam after passage of the structure of interest for subsequently generating a medical image.

8. A method for processing a medical image of a structure of interest, comprising:
   decomposing the medical image into a plurality of band pass images and a low-pass image;
   specifying a plurality of enhancement curves for the medical image based on at least one of: a metric structure length, a structure selectivity, and a structure enhancement strength;
   applying the plurality of enhancement curves to the a plurality of band pass images to generate a plurality of enhanced band pass images;
   composing an enhanced medical image based on the plurality of enhanced band pass images and the low pass image; and
   defining the plurality of enhancement curves based on a decomposition level dependent enhancement parameter, wherein the decomposition level ranges from 0 to n−1, where n denotes the number of band pass images of the plurality of band pass images, and where a separate enhancement curve of the plurality of enhancement curves is specified for each decomposition level.

9. The method according to claim 8, wherein the metric structure length is based on a size of the structure of interest.

10. The method according to claim 8, wherein the structure selectivity is in a range of minimum selectivity to maximum selectivity.

11. A non-transitory computer-readable medium having one or more executable instructions stored thereon, which when executed by a processor, cause the processor to perform a method for processing a medical image of a structure of interest, the method comprising:
   decomposing the medical image into a plurality of band pass images and a low-pass image;
   specifying a plurality of enhancement curves for the medical image based on at least one of: a metric structure length, a structure selectivity, and a structure enhancement strength;
   applying the plurality of enhancement curves to the plurality of band pass images to generate a plurality of enhanced band pass images;
   composing an enhanced medical image based on the plurality of enhanced band pass images and the low pass image; and
   defining the plurality of enhancement curves based on a decomposition level dependent enhancement parameter, wherein the decomposition level ranges from 0 to n−1, where n denotes the number of band pass images of the plurality of band pass images, and where a separate enhancement curve of the plurality of enhancement curves is specified for each decomposition level.

* * * * *